United States Patent
Lunden et al.

(10) Patent No.: US 8,320,921 B2
(45) Date of Patent: Nov. 27, 2012

(54) METHOD AND APPARATUS FOR CELL SELECTION IN FLEXIBLE SPECTRUM USE RADIO SYSTEM

(75) Inventors: Jari Petteri Lunden, Espoo (FI); Elena Virtej, Espoo (FI)

(73) Assignee: Nokia Corporation, Espoo (FI)

(*) Notice: Subject to any disclaimer, the term of this patent is extended or adjusted under 35 U.S.C. 154(b) by 210 days.

(21) Appl. No.: 12/705,548

(22) Filed: Feb. 12, 2010

(65) Prior Publication Data

US 2011/0201340 A1 Aug. 18, 2011

(51) Int. Cl.
- H04W 72/00 (2009.01)
- H04B 7/00 (2006.01)
- G01R 32/08 (2006.01)
- H04H 20/71 (2008.01)

(52) U.S. Cl. ........ 455/447; 455/450; 455/453; 455/509; 455/513; 370/235; 370/312

(58) Field of Classification Search .......... 455/447–453; 370/340–341, 329–330

See application file for complete search history.

(56) References Cited

U.S. PATENT DOCUMENTS

| | | | |
|---|---|---|---|
| 7,200,190 B2* | 4/2007 | Malette et al. ................ | 375/340 |
| 7,308,285 B2* | 12/2007 | Nelson et al. ............... | 455/562.1 |
| 2003/0139197 A1 | 7/2003 | Kostic et al. | |
| 2007/0081462 A1* | 4/2007 | Gefflaut et al. ............... | 370/235 |
| 2008/0102852 A1* | 5/2008 | Du et al. ....................... | 455/453 |
| 2009/0046665 A1 | 2/2009 | Robson | |
| 2010/0110886 A1 | 5/2010 | Sorri | |
| 2010/0150088 A1* | 6/2010 | Dos Santos et al. .......... | 370/329 |
| 2010/0159940 A1* | 6/2010 | Gorokhov et al. ............ | 455/450 |
| 2010/0202339 A1* | 8/2010 | Chieng et al. ................. | 370/312 |
| 2011/0021232 A1* | 1/2011 | Kazmi et al. .................. | 455/509 |
| 2011/0218010 A1* | 9/2011 | Hoymann et al. ............ | 455/513 |

FOREIGN PATENT DOCUMENTS

| | | |
|---|---|---|
| EP | 1863303 | 12/2007 |
| EP | 2106165 | 9/2009 |
| EP | 2106171 | 9/2009 |
| WO | 2008-112255 | 9/2008 |
| WO | 2009-053944 | 4/2009 |
| WO | 2009/056372 | 5/2009 |
| WO | 2009/095400 | 8/2009 |

OTHER PUBLICATIONS

Bennis, Mehdi, et al., "Initial Report on System Aspects of Flexible Spectrum Use", Celtic Telecommunication Solutions, Jan. 9, 2009, 63 pages.

Garcia, Luis, G.U., et al., "Autonomous Component Carrier Selection: Interference Management in Local Area Environments for LTE-Advanced", IEEE Communications Magazine, Sep. 2009, pp. 110-116.

(Continued)

*Primary Examiner* — Michael Faragalla
*Assistant Examiner* — Ngan Pham Lu
(74) *Attorney, Agent, or Firm* — Squire Sanders (US) LLP

(57) ABSTRACT

In accordance with an example embodiment of the present invention, an apparatus comprises a transceiver configured to receive beacons from a plurality of access points; a processor configured to estimate an expected bit-rate for the plurality of access points based at least in part on a frequency spectrum use resourcing, select an access point from the plurality of access points based at least in part on a target expected bit-rate and cause the transceiver to connect to the selected access point.

17 Claims, 4 Drawing Sheets

OTHER PUBLICATIONS

Golaup, Assen, et al., "Femtocell Access Control Strategy in UMTS and LTE", IEEE Communications Magazine, Sep. 2009, pp. 117-123.

Kim, Ronny Yongho, et al., "WiMAX Femtocell: Requirements, Challenges, and Solutions", IEEE Communications Magazine, Sep. 2009, pp. 84-91.

Lopez-Perez, David, et al., "OFDMA Femtocells: A Roadmap on Interference Avoidance", IEEE Communications Magazine, Jun. 2009, pp. 1-8.

Lopez-Perez, David, et al., "OFDMA Femtocells: A Roadmap on Interference Avoidance", IEEE Communications Magazine, Sep. 2009, pp. 41-48.

\* cited by examiner

METHOD AND APPARATUS FOR CELL SELECTION IN FLEXIBLE SPECTRUM USE RADIO SYSTEM

TECHNICAL FIELD

The present application relates generally to a method and apparatus for cell selection in a flexible spectrum use radio system.

BACKGROUND

Flexible spectrum use (FSU) generally refers to any spatially and/or temporally varying use of radio spectrum radio resources. The use of FSU for future wireless systems is intended to provide spectrum sharing between parties that participate actively in the communication process. In a FSU system devices are able to use the spectrum in a flexible manner by adapting their operation to the current situation by sensing the environment or based on pre-defined regulatory policies that can vary in time, place, code and/or event.

An FSU system arranges the sharing of spectrum resources in a self-organizing manner leading to an uncoordinated deployment of the various networks. In an uncoordinated deployment there is no overall control over the placement of access points (APs), nor is there any expectation of frequency planning or any other traditional network planning methods. As a result, user equipments (UEs) must process information received from different APs and decide the optimum AP to associate with by taking into account the knowledge of the FSU situation.

SUMMARY

Various aspects of examples of the invention are set out in the claims.

In accordance with and example embodiment of the present invention, an apparatus, comprising a transceiver configured to receive beacons from a plurality of access points; a processor configured to estimate an expected bit-rate for the plurality of access points based at least in part on a frequency spectrum use resourcing, selecting an access point from the plurality of access point based at least in part on a target expected bit-rate and causing the transceiver to connect to the selected access point.

According to a second aspect of the present invention, a method, comprising receiving beacons from a plurality of access points; estimating an expected bit-rate for the plurality of access points based at least in part on a frequency spectrum use resourcing, selecting an access point from the plurality of access point based at least in part on a target expected bit-rate and connecting to the selected access point.

According to a third aspect of the present invention, an apparatus, comprising at least one processor; and at least one memory including computer program code the at least one memory and the computer program code configured to, with the at least one processor, cause the apparatus to perform at least the following: receiving beacons from a plurality of access points; estimating an expected bit-rate for the plurality of access points based at least in part on a frequency spectrum use resourcing, selecting an access point from the plurality of access points based at least in part on a target expected bit-rate and connecting to the selected access point.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

An example embodiment of the present invention and its potential advantages are understood by referring to FIGS. 1 through 4 of the drawings.

In an uncoordinated local area network the user equipment (UE) decides to which access point (AP) it will connect. However, when flexible spectrum use (FSU) is used, it is not optimal to simply select the closest AP in terms of propagation path loss. Also, combined propagation path loss and AP load information can also lead to suboptimal decision due to the resource use restrictions imposed by the FSU. Thus, the knowledge of the local FSU situation is useful, as different APs may have different number of active neighboring nodes and thus the FSU may limit their share of spectrum resources differently.

Figure 1:
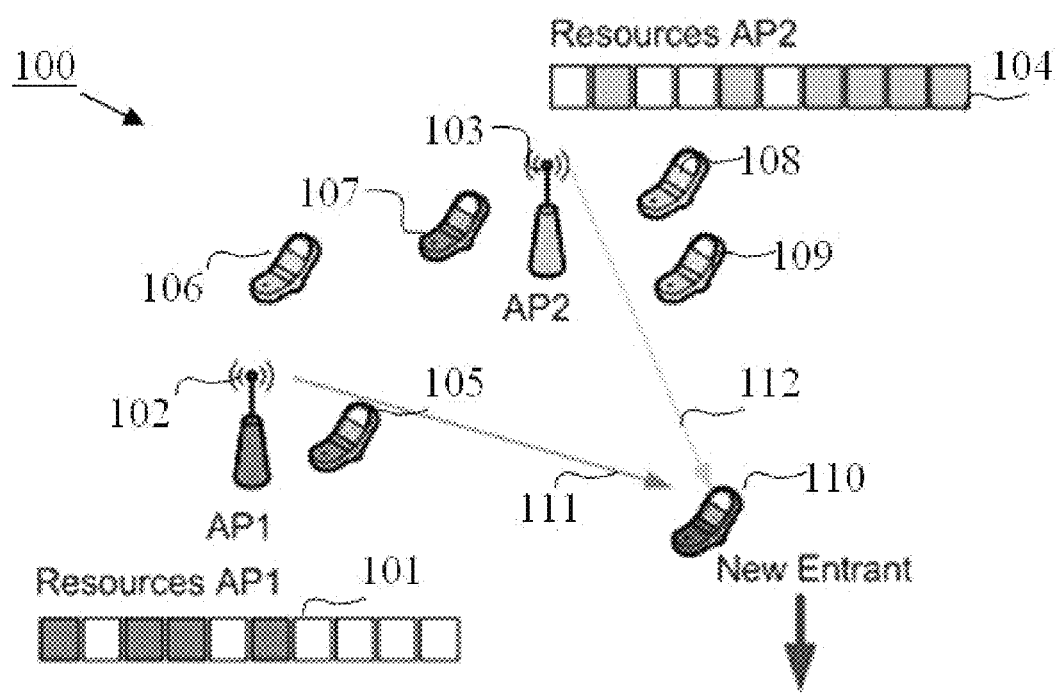
FIG. 1 illustrates an example flexible spectrum use (FSU) cell system.

FIG. 1 illustrates an example flexible spectrum use (FSU) cell system 100. The FSU cell system 100 comprises two access points (APs) 102 and 103. In FIG. 1, the resources at each AP are indicated by 101 and 104. FSU cell system 100, also comprises, a plurality of UEs, 105 through 110. UEs 105 and 107 are served by AP1 and UEs 106, 108 and 109 are served by AP2. The UEs may also be referred to, without a loss of generality, as mobile nodes (MNs), as mobile stations (MSs), or as user terminals (UTs). The APs 102 and 103, each of which may also be referred to without a loss of generality as a Base Station (BS), Femto BS, Node B (NB) or Evolved NB (eNB), may be associated with different radio access networks, and may be considered as neighbors, enabling a single UE to receive transmissions from both APs. A new UE 110 entering the region of coverage of AP1 and AP2 would receive transmission beacons 111 and 112 respectively from APs 102 and 103.

The beacons 111 and 112, which are broadcast transmissions, are received by the UE 110 as well as by other UEs. The UEs can belong to different neighboring networks. The beacons 111 and 112 transmissions can be a response to a probe sent by the UE to identify available APs. The beacons 111 and 112 may be used to identify neighboring cells, available resources 101 and 104 of transmitting APs, and which radio resources the neighbor cells are using. The beacons 111 and 112 may also be used for estimating how much interference the neighbor cells are causing The example embodiments of this invention provide a method for the UE to select the optimum AP to connect to by taking into account at least one of path loss or signal-to-interference and noise ratio (SINR) or signal-to-noise ratio, AP load, interference situation at the UE, interference situation at the AP and locally available resources as indicated by FSU at the AP and/or UE. In the example embodiments, the UE can consider separately downlink (DL) and uplink (UL) channel links, allowing the UE to adjust its decision based on its estimated traffic needs in both channel link directions.

The signaling of information for enabling the UE to make the decision of which AP to connect to can be arranged by including it into the APs broadcast beacons 111 and 112. The content of the information could vary according to the FSU scheme used. In one non limiting example, the beacons, in addition to the general signaling information, could contain one or more of the following:

Number of resource units available at the AP for use.

Number of active neighboring APs in range for FSU coordination e.g. when considering even sharing of spectrum among APs. This information could be averaged over some time period.

AP load indicating average resources used per frame, per transmit time interval (TTI) or number of active UEs served by the AP.

AP effective load indicating how many resources on average a new connecting UE could expect to have per TTI. The AP effective load combines AP load with FSU neighbor information.

Information on which exact resources are available for use by the AP.

Average UL interference (or noise floor) at the AP.

Figure 2:
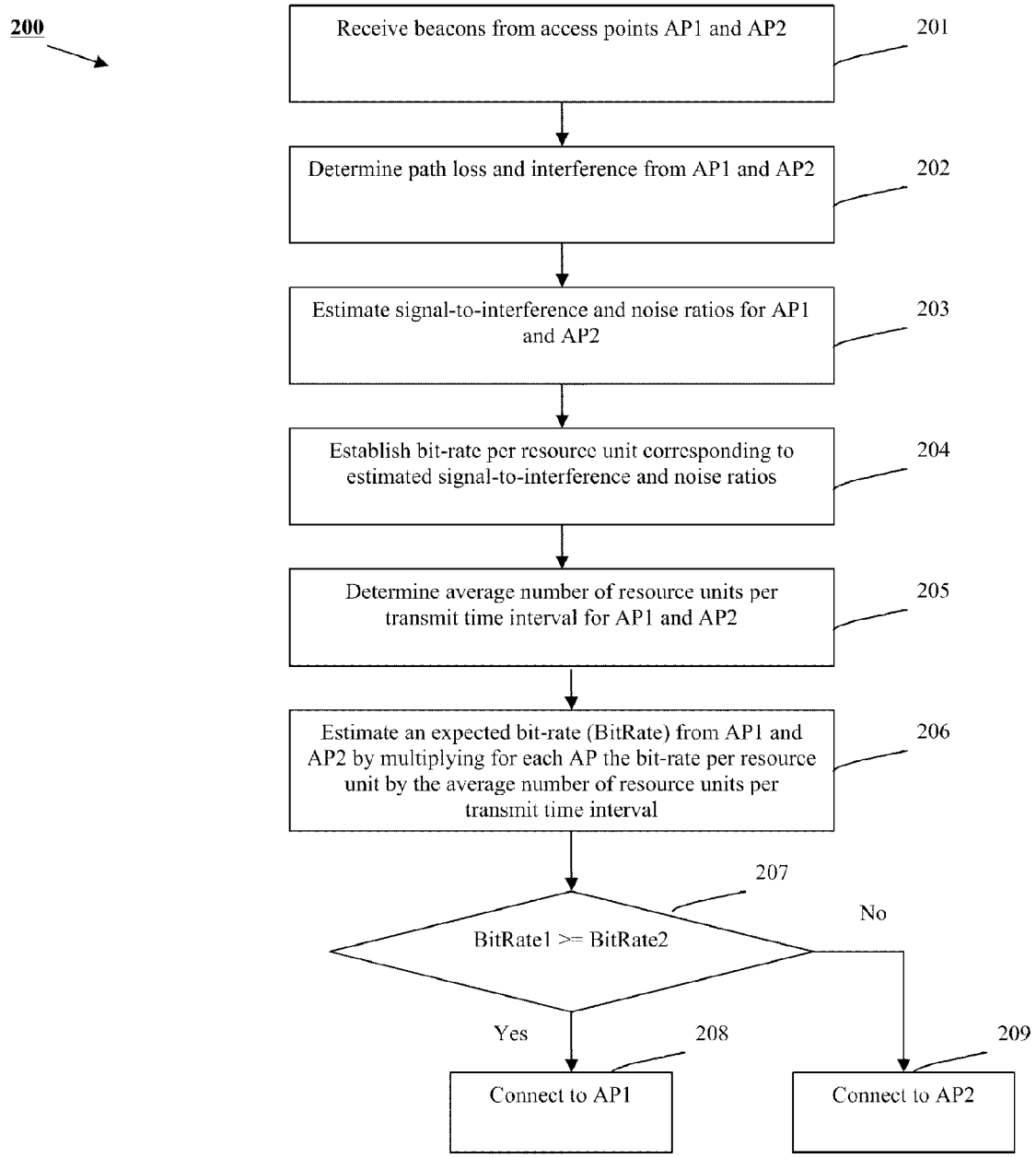
FIG. 2 is an example flow diagram showing operations for flexible spectrum use (FSU) cell selection procedure by a user equipment (UE) when two access points (APs) are in range.

FIG. 2 is an example flow diagram 200 showing operations for FSU cell selection procedure by a UE, for example UE 110 of FIG. 1, when AP1 and AP2 are in range. The flow diagram 200 describes a method by which the UE selects an AP based on the highest expected bit-rate.

In FIG. 2, at block 201, a new UE 110 entering the region of coverage of AP1 and AP2 of FIG. 1, would receive beacons transmission from AP1 and AP2. At block 202, the UE 110 determines path loss and interference from AP1 and AP2. At block 203, the UE 110 estimates the signal-to-interference and noise ratios (SINRs) for each of AP1 and AP2. In an example embodiment, the SINR for each of the APs is estimated based at least in part on the path loss and interference for the AP Based at least in part on the estimated signal-to-interference and noise ratios (SINRs), at block 204, UE 110 establishes the bit-rate per resource unit corresponding to estimated signal-to-interference and noise ratios (SINRs). In one non-limiting example, the bit-rate per resource unit corresponding to estimated SINRs is established from a look-up table. The look-up table may be stored in the UE memory or in accordance with any other method. In an example embodiment, the bit-rate per resource unit is an estimate of how much payload (data) can be transmitted per resource unit per time unit.

At block 205, UE 110 determines the average number of resource units per transmit time interval (TTI) for AP1 and AP2. In an example embodiment, the average number of resource units per TTI is the number of resource units that the user can expect to have scheduled to it in a TTI, taking into account the scheduling/traffic variations which may change from one TTI to another.

At block 206, UE 110 estimates the expected bit-rate from AP1 and AP2. In an example embodiment, the expected bit-rate is estimated by multiplying, for each AP, the bit-rate per resource unit by the average number of resource units per TTI.

At block 207, based on the highest estimated expected bit-rate, UE 110 will decide to connect to AP1 at block 208 or AP2 at block 209.

In addition to selecting the AP providing the highest bit-rate, UE 110 may weigh the decision variables differently. For example, it would be possible to give more weight either to the load of the APs or to the path loss.

Figure 3:
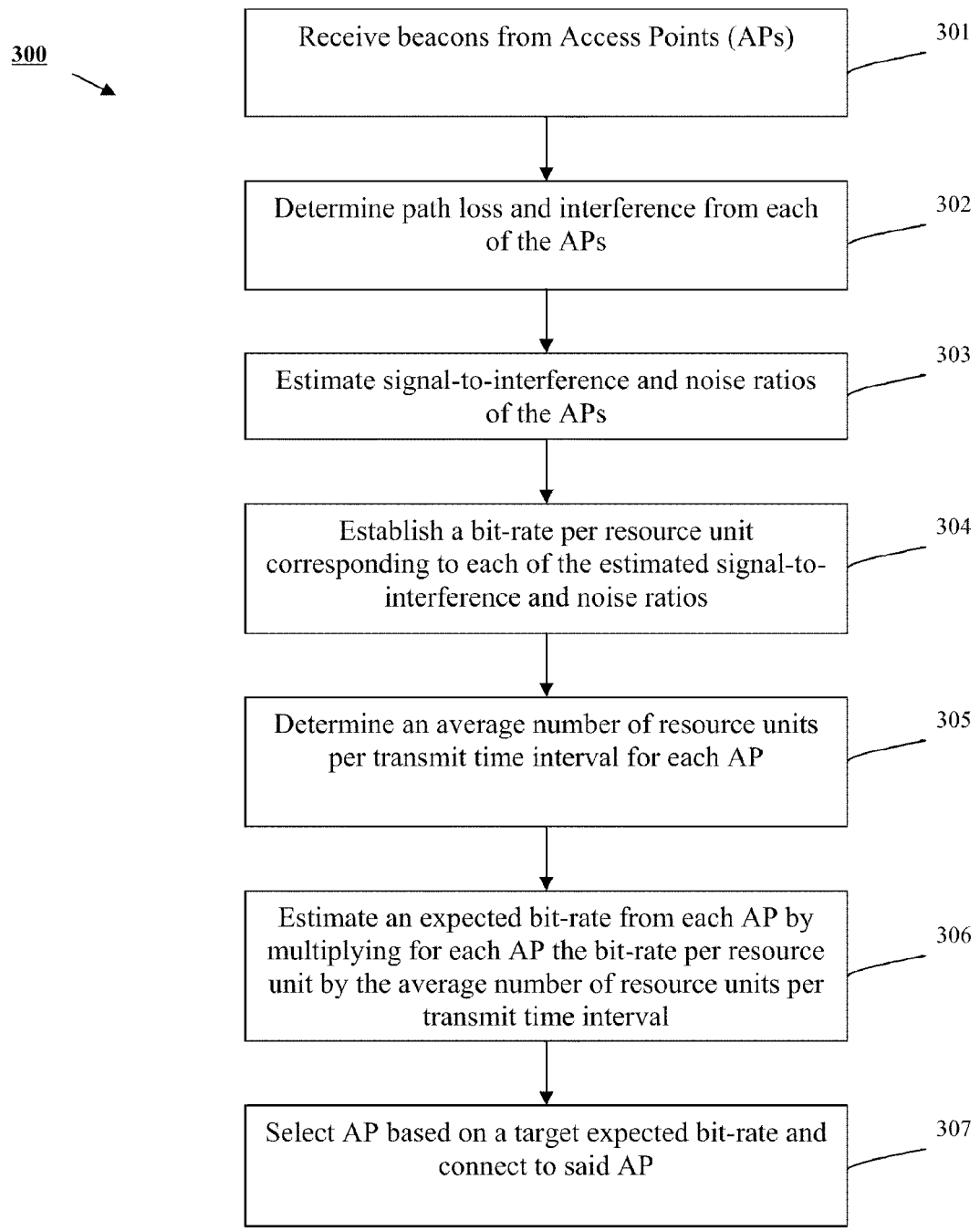
FIG. 3 is an example flow diagram showing operations for flexible spectrum use (FSU) cell selection procedure by a UE when more than two APs are in range.

FIG. 3 is an example flow diagram 300 showing operations for FSU cell selection procedure by a UE, for example UE 110 of FIG. 1, when AP1 and AP2 or more than two access points are in range. The flow diagram 300 describes a method by which the UE selects an AP based on a target expected bit-rate.

In FIG. 3, at block 301, a new UE 110 entering the region of coverage of AP1 and AP2 or more than two access points, would receive beacons transmission from the APs. At block 302, the UE 110 determines path loss and interference from each of the APs. At block 303, the UE 110 estimates the signal-to-interference and noise ratios (SINRs) for each of the APs. In an example embodiment, the SINR for each of the APs is estimated based at least in part on the path loss and interference for the AP.

Based at least in part on the estimated signal-to-interference and noise ratios (SINRs), at block 304, UE 110 establishes the bit-rate per resource unit corresponding to each of the estimated signal-to-interference and noise ratios (SINRs). In one non-limiting example, the bit-rate per resource unit corresponding to estimated SINRs is established from a look-up table. The look-up table may be stored in the UE memory or by any other method. In an example embodiment, the bit-rate per resource unit is an estimate of how much payload (data) can be transmitted per resource unit per time unit.

At block 305, UE 110 determines the average number of resource units per transmit time interval (TTI) for each of the APs. In an example embodiment, the average number of resource units per transmit time interval (TTI) is the number of resource units that the user can expect to have scheduled to it in a TTI, taking into account the scheduling/traffic variations which may change from one TTI to another.

At block 306, UE 110 estimates the expected bit-rate from each of the APs. In an example embodiment, the expected bit-rate is estimated by multiplying for each AP the bit-rate per resource unit by the average number of resource units per TTI.

At block 307, UE 110 selects an AP based on a target expected bit-rate and connection is made to AP. The target expected bit-rate is defined by the UE and the selected AP will be the access point providing the estimated expected bit-rate closest to the target expected bit-rate.

It should be noted that the UE's decision to connect to an AP is but one kind of connection decision. In various network configurations, it might be the case that a UE previously connected to an access point makes a decision to continue that connection or to discontinue that connection in favor of another access point connection based on the example flow diagrams described in FIG. 2 or 3. All of these kinds of decisions regarding the existence, nature, and scope of the UE's connection to an AP are connection decisions intended to be encompassed within this disclosure.

For more accurate estimation of the expected bit-rate, the UE may consider the exact resources available to the AP and which of those are available to the UE as well. These resources are governed by the FSU and the information could be obtained from AP beacons of own and neighboring APs. It is also possible to take into account the average interference power on those resources. In such a scenario, the FSU reservations are semi-permanent and not changing too rapidly.

In one embodiment the received interference may be the downlink (DL) interference, and thus decision by UE on AP selection may be based in part on parameters related to the DL channel. The interference for the DL transmissions is observed at the UE and it may be expected to differ from AP to AP due to the different transmission resources being used by the access points.

In another embodiment, the received interference may be the uplink (UL) interference, and thus decision by UE on AP selection may be based in part on parameters related to the UL channel. The interference for the UL transmissions is observed at the APs and is reported to the UE via the beacons. UE can use information of noise floor/average interference at the AP to estimate the obtainable SINR.

The UL interference at the AP may be signaled in the broadcast beacon, for example as average UL interference. Alternatively, the UE may perform its own local interference measurement on the UL resources. However, this does not make distinction between different APs' local interference levels and gives a bit rougher estimate of the interference. In general, for a frequency division duplex (FDD) system, the UL path loss may be estimated based on the DL path loss while in a time division duplex (TDD) system since UL and DL are on the same carrier path loss is the same. In general, for both FDD and TDD systems, the resources available for UL could be different from those available for DL, but procedure for selecting AP is the same.

Figure 4:
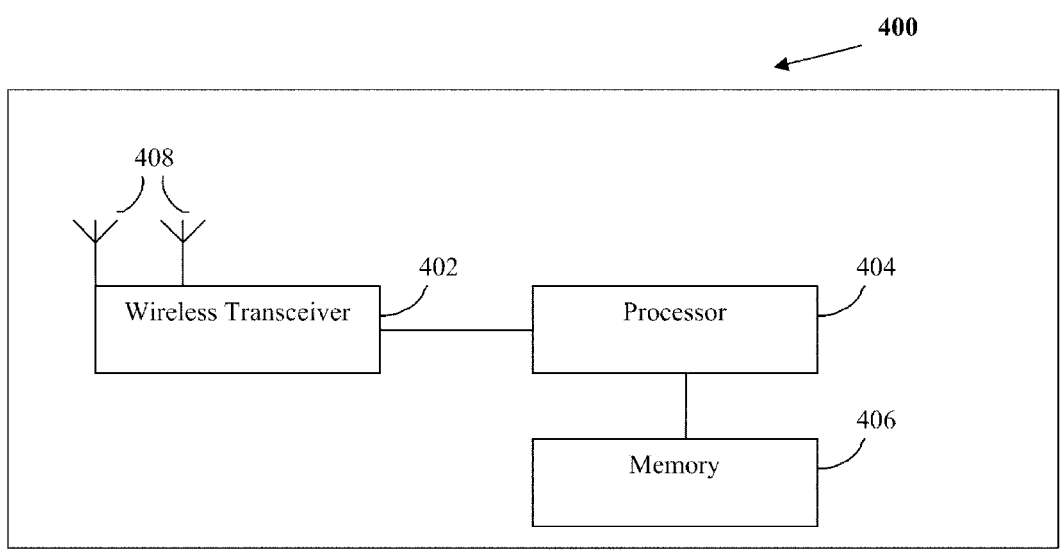
FIG. 4 illustrates an example wireless apparatus.

FIG. 4 illustrates a simplified block diagram 400 of an example wireless apparatus such as one of the UEs, 105 through 110, described in FIG. 1, that is suitable for use in practicing the exemplary embodiments of this invention. In FIG. 4, the apparatus 400 may include a processor 404, a memory 406 coupled to the processor 404, and a suitable wireless transceiver 402 coupled to the processor 404, coupled to an antenna unit 408.

The wireless transceiver 402 is for bidirectional wireless communications with another wireless device. The wireless transceiver 402 may be configured with multiple transceivers including multiple antennae 408. The wireless transceiver 402 may provide frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to some analog baseband processing unit and/or the processor 404 or other central processing unit. In some embodiments, the wireless transceiver 402, portions of the antenna unit 408, and an analog baseband processing unit may be combined in one or more processing units and/or application specific integrated circuits (ASICs).

The antenna unit 408 may be provided to convert between wireless signals and electrical signals, enabling the wireless apparatus 400 to send and receive information from a cellular network or FSU network or some other available wireless communications network or from a peer wireless device. In an embodiment, the antenna unit 408 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna unit 408 may include antenna tuning and/or impedance matching components, RF power amplifiers, and/or low noise amplifiers.

The processor 404 of the wireless apparatus may be of any type suitable to the local application environment, and may include one or more of general-purpose computers, special-purpose computers, microprocessors, digital signal processors ("DSPs"), field-programmable gate arrays (FPGAS), application-specific integrated circuits (ASICS), and processors based on a multi-core processor architecture, as non-limiting examples.

The processor 404 or some other form of generic central processing unit (CPU) or special-purpose processor such as digital signal processor (DSP), may operate to control the various components of the wireless apparatus 400 in accordance with embedded software or firmware stored in memory 406 or stored in memory contained within the processor 404 itself. In addition to the embedded software or firmware, the processor 404 may execute other applications or application modules stored in the memory 406 or made available via wireless network communications. The application software may comprise a compiled set of machine-readable instructions that configures the processor 404 to provide the desired functionality, or the application software may be high-level software instructions to be processed by an interpreter or compiler to indirectly configure the processor 404.

The memory 406 of the wireless apparatus, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 406 may include program instructions or computer program code that, when executed by an associated processor, enable the communication element to perform tasks as described herein.

The processor 404 is configured to determine path loss and interference from each of the APs and estimating SINRs of the plurality of APs. The processor 404 using the memory 406 establishes a bit-rate per resource unit corresponding to each of the estimated SINRs and determines an average number of resource units per Transmit Time Interval (TTI) for each AP. The processor 404 estimates an expected bit-rate from each AP and selects an AP based on a target expected bit-rate and causes the transceiver to connect to said AP.

Without in any way limiting the scope, interpretation, or application of the claims appearing below, a technical effect of one or more of the example embodiments disclosed herein is to have a UE deciding and connecting to an AP providing the highest expected bit-rate based on locally available resources as indicated by FSU in combination with parameters related to the DL channel. Another technical effect of one or more of the example embodiments disclosed herein is to have a UE deciding and connecting to an AP providing a target expected bit-rate based on locally available resources as indicated by FSU in combination with parameters related to the DL channel. Another technical effect of one or more of the example embodiments disclosed herein is to have a UE deciding and connecting to an AP providing a target expected bit-rate based on locally available resources as indicated by FSU in combination with parameters related to the UL channel. Another technical effect of one or more of the example embodiments disclosed herein is to have the UE select a better servicing cell which would lead to a better quality of services experienced by the user and a more balanced load within the network.

Embodiments of the present invention may be implemented in software, hardware, application logic or a combination of software, hardware and application logic. The software, application logic and/or hardware may reside on a user equipment (UE), mobile station or other mobile computing device. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a transceiver configured to receive beacons from a plurality of access points; and
   a processor configured to:
      estimate an expected bit-rate for the plurality of access points based at least in part on a flexible spectrum use resourcing;
      select an access point from the plurality of access points based at least in part on a target expected bit-rate; and
      cause the transceiver to connect to the selected access point,
      wherein the expected bit-rate for at least one of the plurality of access points is estimated based at least in part on a bit-rate per resource unit and an average number of resource units per transmit time interval.

2. The apparatus of claim 1, wherein the bit-rate per resource unit for at least one of the plurality of access points is established based at least in part on an estimated signal-to-interference and noise ratio.

3. The apparatus of claim 1, wherein the bit-rate per resource unit for at least one of the plurality of access points is obtained from a look-up table based on an estimated signal-to-interference and noise ratio.

4. The apparatus of claim 2 or 3, wherein the estimated signal-to-interference and noise ratio for at least one of the plurality of access points is based at least in part on a determined path loss and an interference from the least one of the plurality of access points.

5. The apparatus of claim 4, wherein the determined path loss and interference correspond to an Uplink (UL) path.

6. The apparatus of claim 4, wherein the determined interference is provided in the beacons received from the access points as an average UL interference.

7. The apparatus of claim 1, wherein the average number of resource units per transmit time interval for each access point is obtained from the received beacons.

8. The apparatus of claim 1, wherein the average number of resource units per transmit time interval for each access point is obtained by combining information of an access point load and flexible spectrum use resourcing.

9. The apparatus of claim 8, wherein the access point load is determined by one of average resources used per frame, average transmit time interval or number of active UEs served by the access point.

10. A method, comprising:
    receiving beacons from a plurality of access points;
    estimating an expected bit-rate for the plurality of access points based at least in part on a flexible spectrum use resourcing;
    selecting an access point from the plurality of access points based at least in part on a target expected bit-rate; and
    connecting to the selected access point,
    wherein the expected bit-rate for at least one of the plurality of access points is estimated based at least in part on a bit-rate per resource unit and an average number of resource units per transmit time interval.

11. The method of claim 10, wherein the bit-rate per resource unit for at least one of the plurality of access points is established based at least in part on an estimated signal-to-interference and noise ratio.

12. The method of claim 10, wherein the bit-rate per resource unit for at least one of the plurality of access points is obtained from a look-up table based on an estimated signal-to-interference and noise ratio.

13. The method of claim 10, wherein the average number of resource units per transmit time interval for each access point is obtained by combining information of an access point load and flexible spectrum use resourcing.

14. The method of claim 13, wherein the access point load is determined by one of average resources used per frame, average transmit time interval or number of active UEs served by the access point.

15. An apparatus, comprising:
    at least one processor; and
    at least one memory including computer program code,
    the at least one memory and the computer program code configured to, with the at least one processor, cause the apparatus to perform at least the following:
       receiving beacons from a plurality of access points;
       estimating an expected bit-rate for the plurality of access points based at least in part on a flexible spectrum use resourcing;
       selecting an access point from the plurality of access points based at least in part on a target expected bit-rate; and
       connecting to the selected access point,
       wherein the expected bit-rate for at least one of the plurality of access points is estimated based at least in part on a bit-rate per resource unit and an average number of resource units per transmit time interval.

16. The apparatus of claim 15, wherein the access point is one of a Base Station (BS), Femto BS, Node B (NB) or Evolved NB (eNB).

17. The apparatus of claim 15, wherein the average number of resource units per transmit time interval for each access point is obtained by combining information of an access point load and flexible spectrum use resourcing.

* * * * *